UNITED STATES PATENT OFFICE.

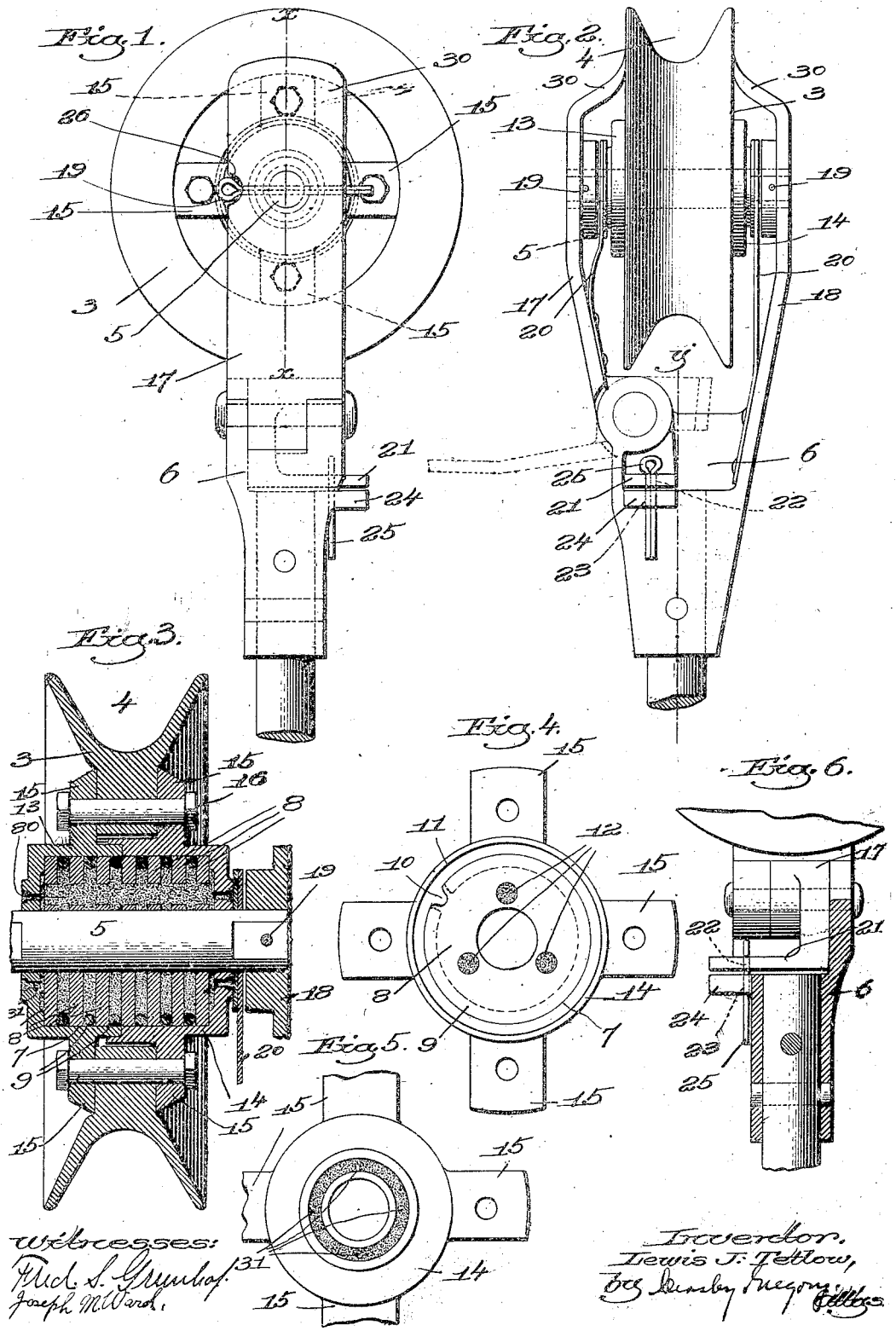

LEWIS J. TETLOW, OF CHICOPEE FALLS, MASSACHUSETTS, ASSIGNOR TO NEW ENGLAND TROLLEY WHEEL COMPANY, OF HOLYOKE, MASSACHUSETTS, A CORPORATION OF MASSACHUSETTS.

TROLLEY-WHEEL.

No. 902,628.     Specification of Letters Patent.     Patented Nov. 3, 1908.

Application filed January 2, 1908. Serial No. 408,863.

*To all whom it may concern:*

Be it known that I, LEWIS J. TETLOW, a citizen of the United States, and a resident of Chicopee Falls, in the county of Hampden and State of Massachusetts, have invented an Improvement in Trolley-Wheels, of which the following description, in connection with the accompanying drawing, is a specification, like letters on the drawing representing like parts.

This invention relates to trolley wheels for electric cars and it has for one of its objects to provide a novel bearing for the trolley wheel which is self-lubricating and which is practically indestructible.

I propose to make the bearing separate from the body of the trolley wheel and to provide simple means for detachably securing the bearing to the trolley wheel body so that as one trolley wheel body becomes worn out it can be removed from the bearing and another one substituted therefor.

I will first describe one embodiment of my invention and then point out the novel features thereof in the appended claims.

In the drawings, Figure 1 is a side view of a trolley wheel and trolley harp embodying my invention; Fig. 2 is a rear view of Fig. 1; Fig. 3 is an enlarged sectional view on the line x—x, Fig. 1; Fig. 4 is an end view of one of the hub sections; Fig. 5 is a side face view of said hub section; Fig. 6 is a section on the line y—y, Fig. 2.

3 is the body of the trolley wheel which is made of some suitable conducting material and which has the usual wire-receiving groove 4 therein. This body is sustained by a hub of novel construction which in turn is loosely mounted on the usual pin 5 of the trolley harp 6.

The hub has been designed to prevent as far as possible any wear between the same and the pin 5, and is also constructed so that the wheel body 3 can be readily detached therefrom when said wheel becomes worn out and unfit for further use. By thus providing a construction in which the wear between the pin and the hub is practically eliminated the same hub may be used for an almost indefinite length of time and may be used in connection with one wheel body after another as fast as each wheel body has become worn out.

In order to provide a hub which will not wear I make the hub with the axle chamber 7 within which is situated a plurality of separate bearing disks 8, said bearing disks each having an aperture therein of a size to receive the pin 5. These bearing disks are of some material having good wearing properties, and may be made either of conducting material or nonconducting material, as desired.

I have found from experience that disks made of compressed fiber give excellent results as the fiber does not show any appreciable wear even after a long time of continuous use. These bearing disks are separated from each other, as above described, and may be held thus separated by any suitable means.

I have herein shown a spacing ring 9 situated between each two disks for the purpose of keeping them thus separated. This spacing ring is preferably in the form of a split ring of spring material which maintains its position in the chamber 7 by the resiliency thereof.

I will also preferably provide some means for preventing the disks from turning in the chamber, and this may conveniently be done by providing the interior of said chamber with a rib 10 which fits into the notches 11 formed in the disks 8.

The space between the separated disks is filled with some lubricating compound 80, and I preferably employ a lubricating compound of solid form and one which is a good conductor of electricity, and which will become fluid when heated, so that after the disks have been assembled, as shown, said compound may be poured into the bearing in a heated state when it will fill in the spaces between the disks and harden as it cools. I find that a lubricating compound made up of bolted and flake graphite mixed together with tallow meets the above requirements.

The disks are shown as having a plurality of holes 12 therein into which the heated lubricating fluid flows, and when it becomes hardened the portion of the lubricant occupying the holes 12 serves to hold and lock the disks in place.

In a bearing thus constructed, the surface or wall of the aperture through which the pin 5 extends is formed partly of the lubricating compound and partly of the harder material forming the bearing disks. Said bearing disks serve to take the wear, and the lubricating compound keeps the bearing thoroughly lubricated. A bearing constructed in this way will outwear a good many trolley wheels, and, therefore, I propose to make the hub detachable from the body of the trolley wheel so that as the body wears out the old body can be removed from the hub and a new body substituted therefor.

In the present embodiment of my invention the hub is made in two sections 13 and 14, each of which is formed with a portion of the chamber 7, and each of which contains a plurality of wearing disks 8.

Each hub section is provided with arms 15 which are adapted to be bolted to the wheel body, as at 16, the wheel body being readily removed from the hub by simply removing the bolts, as will be obvious.

By my improved construction I have practically eliminated wear between the hub or bushing of the trolley wheel and the pivotal pin, which is the point where the greatest wear occurs in the ordinary construction.

The trolley harp is provided with the two arms 17 and 18 in which the pin 5 is sustained, and preferably the ends of the pin are non-circular and fit non-circular apertures in said arms, said pin being held in place by cotter pins 19.

To facilitate the removal of the trolley wheel from the harp when it is desired to substitute a new wheel body in place of the worn one, the arm 17 of the trolley harp is pivotally mounted so that it can be swung away from the other arm, as shown in dotted lines Fig. 2, to readily permit the trolley wheel to be slipped off from the pin 5.

It will be understood that before the arm 17 can be swung into the dotted line position the cotter pin 19 connecting said arm to the pin 5 will have to be removed. The arms 17 and 18 are provided with the usual spring contacts 20 which engage the ends of the hub and form the necessary electrical contact between the trolley wheel and the trolley harp.

The pivoted arm 17 is provided with the locking arm 21 and the latter has an aperture 22 therein which registers with an aperture 23 in a lug 24 formed on the trolley harp when the arm 17 is in the full line position Fig. 2.

When the trolley is in use a locking pin 25 is inserted through the apertures 22 and 23, and thus a double lock is provided for the arm 17. So long as the locking pin 25 is in position the arm 17 cannot swing into its dotted line position even though one or both of the cotter pins 19 should become lost; and as there is almost no danger that both the locking pin 25 and the cotter pins 19 will simultaneously be lost an effective lock is thus provided for the pivoted arm 17.

The arms 17 and 18 are shown as having recesses 26 therein into which the heads of the cotter pins 19 are received. These recesses are formed on that side of the arms which face toward the trolley wire when the trolley is in use and by thus protecting the heads of the cotter pins there is no danger that they will become caught or entangled in the trolley wire.

The upper ends of the arms 17 and 18 are bent inwardly, as at 30, to thus constitute a guard to prevent the trolley wire from getting caught between the trolley wheel and the arms of the trolley harp.

The hub is preferably provided with apertures 31 in the ends which engage the contact strips 20, said apertures permitting a sufficient amount of the lubricant to be exposed at the surface to lubricate the contacting surfaces of the hub and contact strips and thus prevent wear.

The bearing herein described can be advantageously used in connection with other devices than trolley wheels, and the invention is not limited in its use to trolley wheels.

I have described herein only one embodiment of my invention and have not attempted to describe different modifications which might be made in the invention.

Having fully described my invention, what I claim as new and desire to secure by Letters Patent is:—

1. In a trolley wheel, the combination with a wheel body having a wire-receiving groove, of a hub therefor, said hub having a chamber, a plurality of bearing disks within said chamber each having an aperture to receive the pivotal pin, means between the disks to maintain them spaced from each other, and lubricating material filling the spaces between said disks.

2. In a trolley wheel, the combination with a wheel body, of a hub detachably secured thereto, said hub having a chamber, a plurality of bearing disks within the chamber each having an aperture to receive the pin, means to maintain said disks separated, and lubricating material filling the spaces between said disks.

3. In a trolley wheel, the combination with a wheel body, of a two-part hub, means to detachably secure said hub to the wheel body, said hub having a central chamber, a plurality of bearing disks within said chamber, said disks being spaced from each other, means to maintain said disks separated and lubricating material filling the spaces between the disks.

In testimony whereof, I have signed my name to this specification, in the presence of two subscribing witnesses.

LEWIS J. TETLOW.

Witnesses:
 Louis C. Smith,
 Margaret A. Dunn.